(12) United States Patent
Ohseki et al.

(10) Patent No.: US 12,328,732 B2
(45) Date of Patent: Jun. 10, 2025

(54) TERMINAL DEVICE, BASE STATION DEVICE, CONTROL METHOD, AND STORAGE MEDIUM FOR CONTROLLING THE TRANSMISSION OF SIGNALS

(71) Applicant: KDDI CORPORATION, Tokyo (JP)

(72) Inventors: Takeo Ohseki, Fujimino (JP); Kazuhide Toda, Fujimino (JP); Yasuhiro Suegara, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 403 days.

(21) Appl. No.: 16/560,199

(22) Filed: Sep. 4, 2019

(65) Prior Publication Data

US 2019/0394797 A1 Dec. 26, 2019

Related U.S. Application Data

(63) Continuation of application No. PCT/JP2018/012879, filed on Mar. 28, 2018.

(30) Foreign Application Priority Data

Apr. 3, 2017 (JP) .................... 2017-073531

(51) Int. Cl.
*H04W 72/23* (2023.01)
*H04W 72/1263* (2023.01)
*H04W 72/21* (2023.01)

(52) U.S. Cl.
CPC ....... *H04W 72/23* (2023.01); *H04W 72/1263* (2013.01); *H04W 72/21* (2023.01)

(58) Field of Classification Search
CPC ......... H04W 72/1289; H04W 72/1284; H04W 72/1263; H04W 72/14; H04L 5/0091; H04L 5/0053
See application file for complete search history.

(56) References Cited

U.S. PATENT DOCUMENTS

| 9,301,316 B2 | 3/2016 | Moulsley et al. |
| 9,439,209 B2 | 9/2016 | Korhonen et al. |
| 10,362,597 B2 | 7/2019 | Andersson et al. |

(Continued)

FOREIGN PATENT DOCUMENTS

| CN | 103782640 A | 5/2014 |
| EP | 2903380 A1 | 8/2015 |

(Continued)

OTHER PUBLICATIONS

Extended European Search Report for European Patent Application No. 18781539.4 mailed Feb. 25, 2020.

(Continued)

*Primary Examiner* — Jackie Zuniga Abad (74) *Attorney, Agent, or Firm* — Thomas | Horstemeyer, LLP (57) ABSTRACT

A terminal device selects, in a case where data that is to be transmitted to the base station device is generated, one setting for use in transmission of a scheduling request to a base station device, from among a plurality of settings that correspond to different combinations of a bandwidth, a time duration, and a periodicity and can be used in transmission of the scheduling request, and transmits the scheduling request to the base station device with use of the one setting that was selected.

14 Claims, 4 Drawing Sheets

(56) References Cited

U.S. PATENT DOCUMENTS

| | | | |
|---|---|---|---|
| 2013/0044699 A1* | 2/2013 | Eriksson | H04W 72/23 370/329 |
| 2014/0133447 A1 | 5/2014 | Moulsley et al. | |
| 2014/0241302 A1 | 8/2014 | Korhonen et al. | |
| 2015/0223264 A1 | 8/2015 | Cheng et al. | |
| 2016/0105905 A1* | 4/2016 | Vajapeyam | H04B 7/0626 370/330 |
| 2016/0365959 A1* | 12/2016 | Dinan | H04L 5/0055 |
| 2017/0208523 A1* | 7/2017 | Yang | H04W 36/0088 |
| 2017/0251492 A1 | 8/2017 | Andersson et al. | |
| 2018/0115985 A1* | 4/2018 | Lee | H04W 72/1268 |
| 2021/0136794 A1* | 5/2021 | Takeda | H04W 4/00 |

FOREIGN PATENT DOCUMENTS

| | | |
|---|---|---|
| WO | 2016029933 A1 | 3/2016 |
| WO | 2016/182343 A1 | 11/2016 |
| WO | 2018/186264 A1 | 10/2018 |

OTHER PUBLICATIONS

International Search Report for PCT/JP2018/012879 mailed Jun. 19, 2018.

3GPP, TS 36.300, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), Dec. 2016, V14.1.0.

LG Electronics Inc., SR enhancement for new RAT, 3GPP TSG-RAN WG2 #97bis R2-1703491, Mar. 24, 2017, section 2.

Intel Corporation, Scheduling request design for NR, 3GPP TSG-RAN WGI #86bis RI-1610191, Oct. 1, 2016, sections 2 and 3.

LG Electronics, Considerations on PUCCH design for URLLC, 3GPP TSG-RAN WGI #88bis RI-1704914, Mar. 25, 2017, entire text.

Chinese Office Action for Chinese Patent Application No. 201880019941.6 mailed Aug. 29, 2022.

* cited by examiner

TERMINAL DEVICE, BASE STATION DEVICE, CONTROL METHOD, AND STORAGE MEDIUM FOR CONTROLLING THE TRANSMISSION OF SIGNALS

CROSS-REFERENCE TO RELATED APPLICATIONS

This application is a continuation of International Patent Application No. PCT/JP2018/012879 filed on Mar. 28, 2018, which claims priority to and the benefit of Japanese Patent Application No. 2017-073531, filed Apr. 3, 2017, the entire disclosures of which are incorporated herein by reference.

BACKGROUND OF THE INVENTION

Field of the Invention

The present invention relates to a terminal device, a base station device, a control method, and a program, and specifically relates to a technique for controlling the transmission of signals by a terminal device.

Description of the Related Art

In an ordinary cellular radio communication system, when an uplink signal is to be transmitted, a terminal device transmits a scheduling request to a base station device, receives an uplink grant from the base station device, and then transmits an uplink radio signal in accordance with the uplink grant. For example, in the case of Long Term Evolution (LTE), an available radio resource corresponding to one time slot (0.5 ms) with the highest frequency and another available radio resource corresponding to one time slot with the lowest frequency are used in the transmission of a scheduling request. Note that a total of two radio resources, specifically one for each of the aforementioned two frequencies, can be assigned every 10 ms or 20 ms as a radio resource for scheduling request transmission, for example.

In a fifth-generation cellular radio communication system, examination is underway on technology for realizing Ultra Reliable Low Latency Communication (URLLC). In such a system, given the fact that, conventionally, a scheduling request can only be transmitted with use of radio resources corresponding to two 0.5 ms time slots every 10 ms or 20 ms, and the fact that scheduling request transmission requires at least 0.5 ms, it is envisioned that there are cases where a latency requirement cannot be met. For this reason, in order to realize URLLC, it is envisioned that a scheduling request will be transmitted with use of radio resource having a short periodicity and a short time duration. However, when a radio resource having a short time duration is used, there can be cases where a terminal device located at a position distant from a base station device cannot transmit a scheduling request with sufficient power for reaching the base station device while also not interfering with other signals. In other words, there may be a limit to the geographical range in which the terminal device can transmit a scheduling request that is effective (can reach the base station device), and the ability of the terminal device to perform communication may be limited.

SUMMARY OF THE INVENTION

The present invention provides technology for appropriately meeting a demand for low latency and a demand for communication capability.

A terminal device according to one aspect of the present invention includes: a selecting unit configured to select, in a case where data that is to be transmitted to the base station device is generated, one setting for use in transmission of a scheduling request to a base station device, from among a plurality of settings that correspond to different combinations of a bandwidth, a time duration, and a periodicity and can be used in transmission of the scheduling request; and a transmitting unit configured to transmit the scheduling request to the base station device with use of the one setting that was selected.

Also, a base station device according to one aspect of the present invention includes: a determining unit configured to determine one or more settings that correspond to different combinations of a bandwidth, a time duration, and a periodicity and are to be used by the terminal device to transmit a scheduling request; and a notifying unit configured to transmit information regarding the one or more settings to the terminal device.

Further features of the present invention will become apparent from the following description of exemplary embodiments (with reference to the attached drawings).

BRIEF DESCRIPTION OF THE DRAWINGS

The attached drawings are included in and constitute a part of the specification, illustrate embodiments of the present invention, and are used together with the description thereof to explain the principle of the present invention.

DESCRIPTION OF THE EMBODIMENTS

Hereinafter, an embodiment of the present invention will be described with reference to the drawings.

System Configuration

Figure 1:
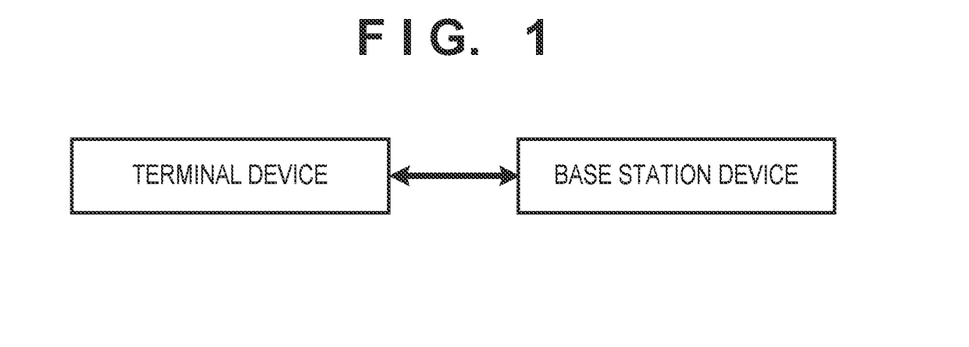
FIG. 1 is a diagram showing an example of a configuration of a radio communication system.

FIG. 1 shows the configuration of a radio communication system according to the present embodiment. This radio communication system is configured to include a terminal device and a base station device that can communicate with each other using fifth generation radio communication technology for example. Note that the terminal device and the base station device may be able to use fourth generation or earlier radio communication technology such as Long Term Evolution (LTE), and may be able to use radio communication technology other than cellular communication technology. For the sake of simplicity, FIG. 1 shows an example of the case where there is one terminal device and one base station device, but ordinarily there are many terminal devices and base station devices, and processing can be executed as described below.

The present embodiment gives an example of communication control for when the terminal device transmits a radio signal (radio packet) to the base station device. In accordance with the generation of data (user data) that is to be transmitted, the terminal device transmits a scheduling request to the base station device, and then receives an uplink grant in response to the scheduling request from the base station device. The terminal device then uses the radio resource designated in the uplink grant to transmit a radio signal that substantially includes the data to the base station device. Here, "substantially includes" not only means including the actual symbol stream or bit stream expressing the data, but also means including part or all of data obtained by subjecting such data to processing such as error correction coding.

Figure 2:
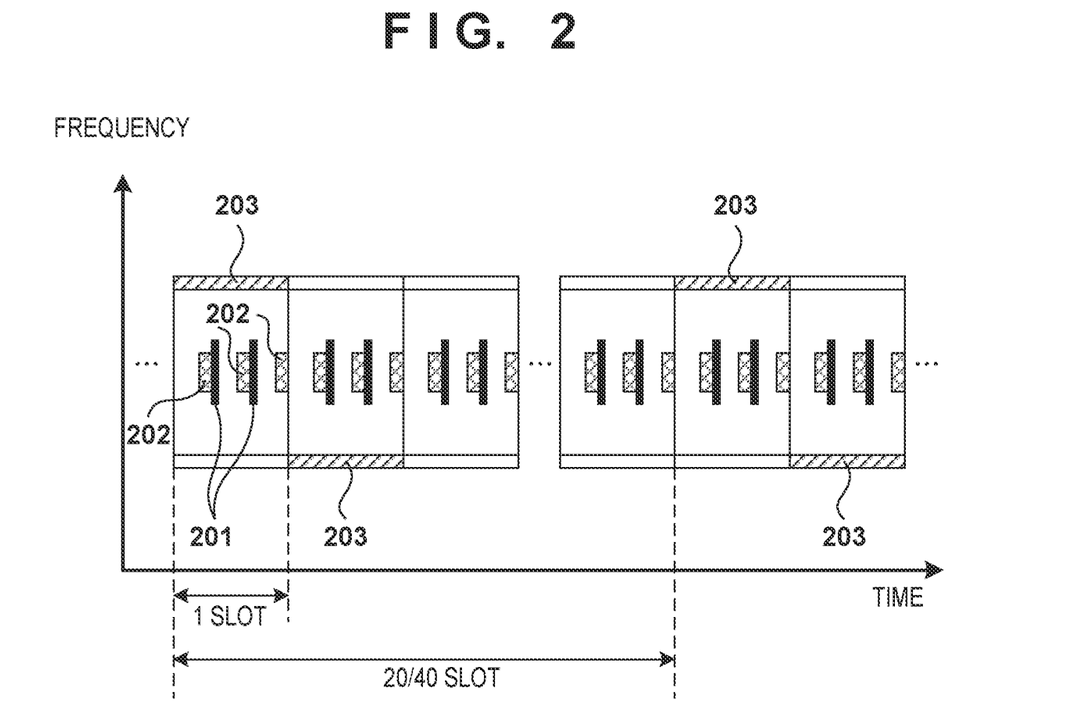
FIG. 2 is a diagram showing an example of settings corresponding to radio resources that can be used for a scheduling request.

In the present embodiment, the terminal device holds multiple settings that correspond to radio resources made up of different combinations of a bandwidth, a time duration, and a periodicity and that can be used when transmitting a scheduling request to the base station device. An example of settings at this time is shown in FIG. 2. FIG. 2 shows a first setting 201, a second setting 202, and a third setting 203. The third setting 203 corresponds to a radio resource that is arranged over one time slot at both the upper end and the lower end of an available frequency resource at a periodicity of 20 or 40 time slots, for example. Note that the third setting 203 can be a radio resource for scheduling request transmission in Long Term Evolution (LTE), for example. Also, the second setting 202 corresponds to a radio resource that has a substantially smaller time duration than the time duration (one time slot) in the third setting 203 and has a substantially larger bandwidth than that in the third setting 203, at a periodicity of three times in one time slot, for example. Furthermore, the first setting 201 corresponds to a radio resource that has a smaller time duration than the time duration in the second setting 202 and has a larger bandwidth that that in the second setting 202, at a periodicity of two times in one time slot, for example. The terminal device holds two or more of these settings, for example. Note that the terminal device holds a time offset value indicating a time offset from a reference time for each of the settings. This is for making it possible to specify the absolute position of the radio resource in each setting. The terminal device can also hold code information (a code sequence number or a cyclic shift amount in the code sequence) for each setting. The terminal device can therefore specify the coding that is to be used in the case where the radio resource in the setting is to be code-multiplexed with another terminal device.

Note that the base station device can transmit, to the terminal device, information regarding one or more settings that are to be used by the terminal device when transmitting a scheduling request, for example. For example, the base station device can determine one or more settings in accordance with the latency requirement of a radio bearer established by the terminal device, or based on transmission path loss between the base station device and the terminal device. As one specific example, if a radio bearer having a short latency requirement is established, the base station device can determine that a setting having a short time duration and a short periodicity is to be used when the terminal device transmits a scheduling request. As another example, the base station device can determine that the terminal device is to transmit a scheduling request with use of a setting that has a shorter time duration the smaller the transmission path loss is between the base station device and the terminal device, and with use of a setting that has a longer time duration the larger the transmission path loss is. Also, the base station device may combine multiple criteria, such as determining a setting in accordance with the latency requirement if the latency requirement is smaller than a predetermined value for example, and determining a setting based on transmission path loss if a radio bearer having a long latency requirement is established for example. The setting that is to be used by the terminal device may also be determined using other criteria. Upon acquiring this setting information from the base station device, the terminal device can hold the acquired setting as one usable setting. Note that the terminal device may use the one or more settings received from the base station device to replace settings that are currently being held, or may update the currently held settings. For example, the terminal device may store the settings acquired from the base station device along with the acquisition time in addition to the settings that are being held at that time, and delete any held settings for which the time period since acquisition has reached a predetermined time period. Note that the transmission of setting-related information from the base station device to the terminal device can be performed using an RRC message that is transmitted from the base station device in order to establish a connection between the base station device and the terminal device in a procedure of random access from the terminal device, for example. Note that the terminal device can transmit information indicating the settings that are being held at that time to the base station device. The terminal device can transmit this information using a signal that is included in the random access preamble when the random access preamble is transmitted, or using a separate signal that is transmitted in parallel with the random access preamble.

When data that is to be transmitted is generated, the terminal device selects one setting for use in scheduling request transmission from among the held settings, and transmits a scheduling request to the base station device with use of the radio resource that corresponds to the selected setting. For example, at this time, if the terminal device does not receive an uplink grant in response to the scheduling request that was transmitted with use of the first setting 201, the terminal device can select the second setting 202 and transmit a scheduling request with use of the second setting 202. In other words, if the terminal device first transmits a scheduling request with a short time duration (and a wide bandwidth) and then successfully receives a corresponding uplink grant, communication will be able to be performed with low latency. However, if the terminal device does not receive an uplink grant in response to the scheduling request transmitted with a short time duration, the scheduling request can then be transmitted with use of a different setting that has a comparatively longer time duration. Accordingly, the scheduling request transmission power can be increased in terms of time, thus making it possible to increase the probability that the base station device will successfully receive the scheduling request. If the terminal device does not receive an uplink grant in response to the scheduling request that was transmitted using the second setting 202, the terminal device can then select the third setting 203 and transmit the scheduling request with use of the third setting 203. Note that even in the case where the third setting 203 has been used, the terminal device may subsequently transmit a scheduling request with use of the first setting 201 or the second setting 202 until the next timing that corresponds to the radio resource corresponding to the third setting 203 is reached, for example. Note that although the above example pertains to the case of using settings in order of shortest time duration, there is no limitation to this sequence. In other words, any sequence may be used, such as first using the second setting 202 and then using the first setting 201. Also, a configuration is possible in which the terminal device transmits a scheduling request a predetermined number of times or over a predetermined time period with the currently used setting, and then a different setting is used if no uplink grant was received. Furthermore, the terminal device may select a setting each time a scheduling request is transmitted or re-transmitted. The terminal device can thus reliably transmit a scheduling request to the base station device.

Also, the terminal device may select a setting for use based on transmission path loss on the transmission path between the base station device and the terminal device. For example, the terminal device can estimate the downlink transmission path loss based on a signal received from the base station device, and select a setting based on the estimated value. For example, the terminal device can select a setting with a longer time duration the larger the transmission path loss is (i.e., the less favorable the propagation environment is), and select a setting with a shorter time duration the smaller the transmission path loss is. Accordingly, the terminal device can transmit a scheduling request to the base station device with a power sufficient for reaching the base station device and with as little latency as possible in accordance with the propagation environment.

The following describes the configuration of the terminal device and the base station device that execute the above-described processing, and also the flow of the processing.

Device Configuration

Figure 3:
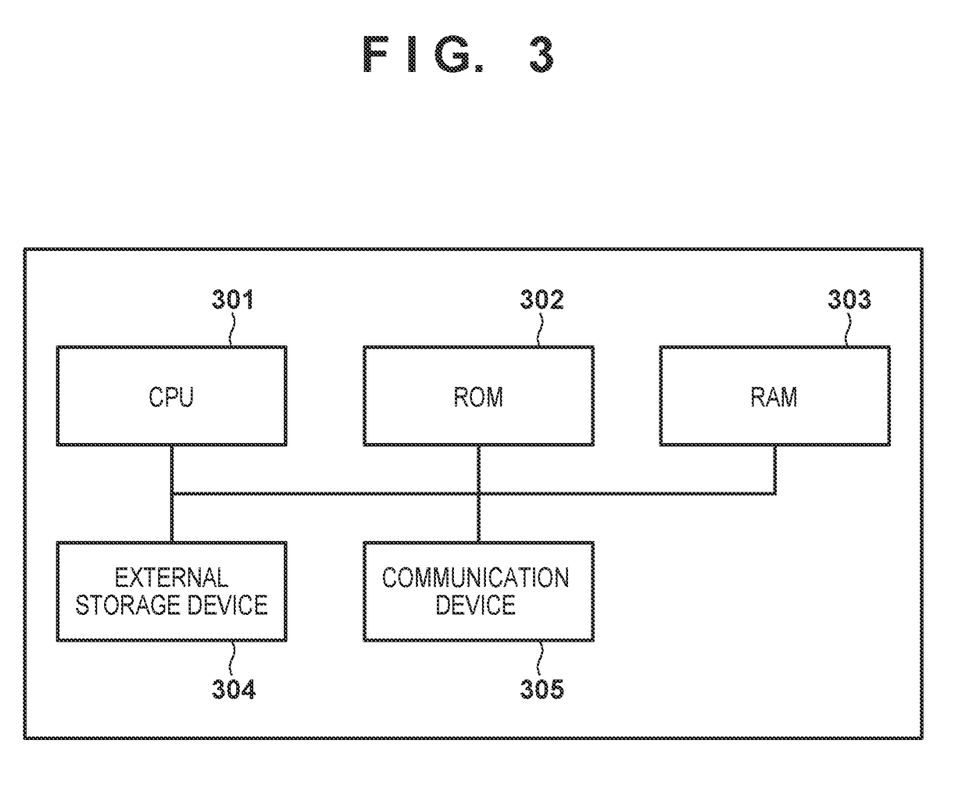
FIG. 3 is a diagram showing an example of a hardware configuration of a terminal device and a base station device.

FIG. 3 shows an example of the hardware configuration of the terminal device and the base station device. In one example, the terminal device and the base station device have the hardware configurations shown in FIG. 3, that is to say include a CPU 301, a ROM 302, a RAM 303, an external storage device 304, and a communication device 305. In the terminal device and the base station device, the CPU 301 executes a program that realizes the functions of the terminal device or the base station device and is stored in the ROM 302, the RAM 303, or the external storage device 304, for example. Note that the CPU 301 may be replaced with one or more processors such as an ASIC (Application-Specific Integrated Circuit)), an FPGA (Field Programmable Gate Array), or a DSP (Digital Signal Processor).

In the terminal device and the base station device, communication between the base station device and the terminal device is performed by the CPU 301 controlling the communication device 305, for example. Note that although FIG. 3 is a schematic view in which the terminal device and the base station device have one communication device 305, there is no limitation to this. For example, the terminal device may have two or more communication devices 305 in order to perform communication with two or more base station devices, and may further have another communication device 305 for communication in another system. The base station device may also have two or more communication devices 305 in order to communicate with other base station devices.

Note that the terminal device and the base station device may include dedicated hardware for executing each function, or a configuration is possible in which some functions are executed by hardware and other functions are executed by a computer that runs a program. Moreover, all of the functions may be executed by the computer and a program.

Figure 4:
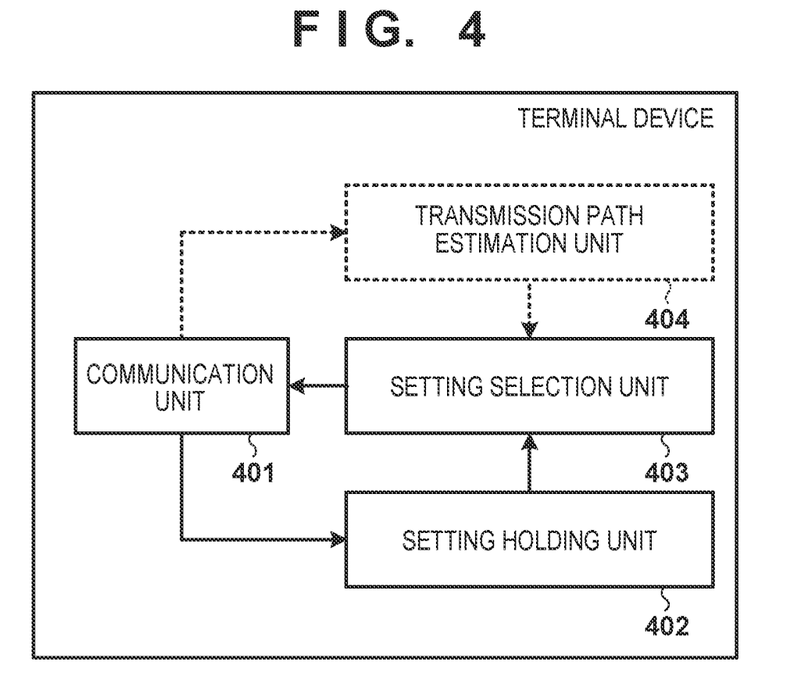
FIG. 4 is a block diagram showing an example of a function configuration of the terminal device.

FIG. 4 is a block diagram showing an example of the function configuration of the terminal device. The terminal device is configured to include a communication unit 401, a setting holding unit 402, and a setting selection unit 403, for example, and further includes a transmission path estimation unit 404 in some cases.

The communication unit 401 can perform communication with one or more base station devices, and is capable of transmitting a scheduling request to a base station device, receiving an uplink grant, and transmitting an uplink radio signal with use of a radio resource designated in the uplink grant. Note that the communication unit 401 can also receive a downlink radio signal from a base station device.

The setting holding unit 402 holds settings that can be used when a scheduling request is transmitted by the communication unit 401. The setting holding unit 402 acquires setting information via the communication unit 401 for example, and holds the acquired setting information. Note that as described above, the settings each correspond to a radio resource specified from a combination of a time duration, a bandwidth, and a periodicity, and can each further include a time offset value indicating a time offset from a reference time in order to specify an absolute timing. Each of the settings may also include code information (a code sequence number or a cyclic shift amount in the code sequence) indicating the coding that is to be used if signals from multiple terminal devices are to be code-multiplexed with the corresponding radio resource.

When the terminal device is to transmit a scheduling request to the base station device, the setting selection unit 403 selects a setting for use from among the settings held by the setting holding unit 402. For example, the setting selection unit 403 can select a setting having a shorter time duration with priority, or in other words, in the order of the first setting 201, then the second setting 202, and then the third setting 203 in the example in FIG. 2. If the communication unit 401 does not receive an uplink grant after the setting selection unit 403 has transmitted a scheduling request with use of the selected setting, the setting selection unit 403 can select a setting having a longer time duration. Note that a configuration is possible in which the setting selection unit 403 transmits a scheduling request a predetermined number of times or over a predetermined time period with use of the selected setting, and then changes the setting that is to be used if no uplink grant was received. Note that the setting selection unit 403 may select, as the setting for use, the setting that will have the soonest time of completion of scheduling request transmission. For example, in the case where scheduling request transmission will be completed sooner in the case of using the second setting 202 than in the case of using the first setting 201, the setting selection unit 403 may select the second setting 202 as the setting for use. Moreover, the setting selection unit 403 may determine the setting for use based on transmission path loss between the base station device and the terminal device, which is estimated by the transmission path estimation unit 404. For example, the setting selection unit 403 can select a setting with a longer time duration if the transmission path loss is high, and select a setting with a shorter time duration if the transmission path loss is small.

The transmission path estimation unit 404 estimates transmission path loss based on a downlink radio signal that is received from the base station device via the communication unit 401, for example. Note that a configuration is possible in which the transmission path estimation unit 404 acquires, from the base station device via the communication unit 401, information indicating the estimated value of transmission path loss based on an uplink signal that the base station device received from the terminal device.

Figure 5:
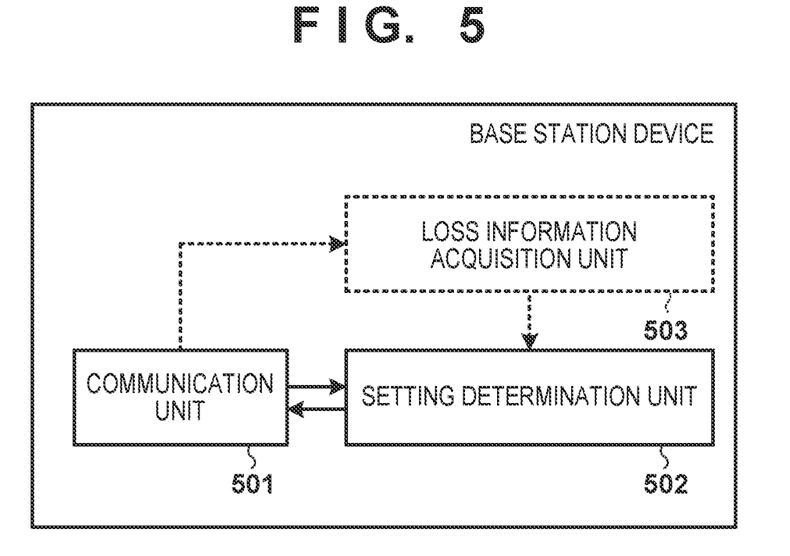
FIG. 5 is a block diagram showing an example of a function configuration of the base station device.

FIG. 5 is a diagram showing an example of the function configuration of the base station device. The base station device is configured to include a communication unit 501 and a setting determination unit 502 for example, and further includes a loss information acquisition unit 503 in some cases.

The communication unit 501 can communicate with one or more terminal devices, and upon receiving a scheduling request from the terminal device, the communication unit 501 specifies a radio resource that can be used, and issues an uplink grant. The communication unit 501 can receive an uplink radio signal from the terminal device in the specified radio resource. Note that the communication unit 501 can also transmit a downlink radio signal to the terminal device.

The setting determination unit 502 determines one or more settings regarding a radio resource that is to be used in the transmission of a scheduling request by the terminal device. The setting determination unit 502 can determine one or more settings in accordance with the latency requirement of a radio bearer established by the terminal device, for example. The setting determination unit 502 can also determine one or more settings based on transmission path loss between the base station device and the terminal device that is estimated by the loss information acquisition unit 503, for example.

For example, the loss information acquisition unit 503 can estimate the transmission path loss between the base station device and the terminal device by estimating the transmission path loss on the uplink transmission path by monitoring the uplink from the terminal device to the base station device via the communication unit 501. Also, the loss information acquisition unit 503 may acquire, via the communication unit 501, an estimated value of downlink transmission path loss that is based on measurement performed by the terminal device. Note that information indicating this estimated value of downlink transmission path loss can be transmitted from the terminal device to the base station device with use of an existing Measurement Report framework, for example. In other words, the setting determination unit 502 can determine one or more settings based on transmission path loss in at least one of an uplink and a downlink between the base station device and the terminal device.

Processing Flow

Figure 6:
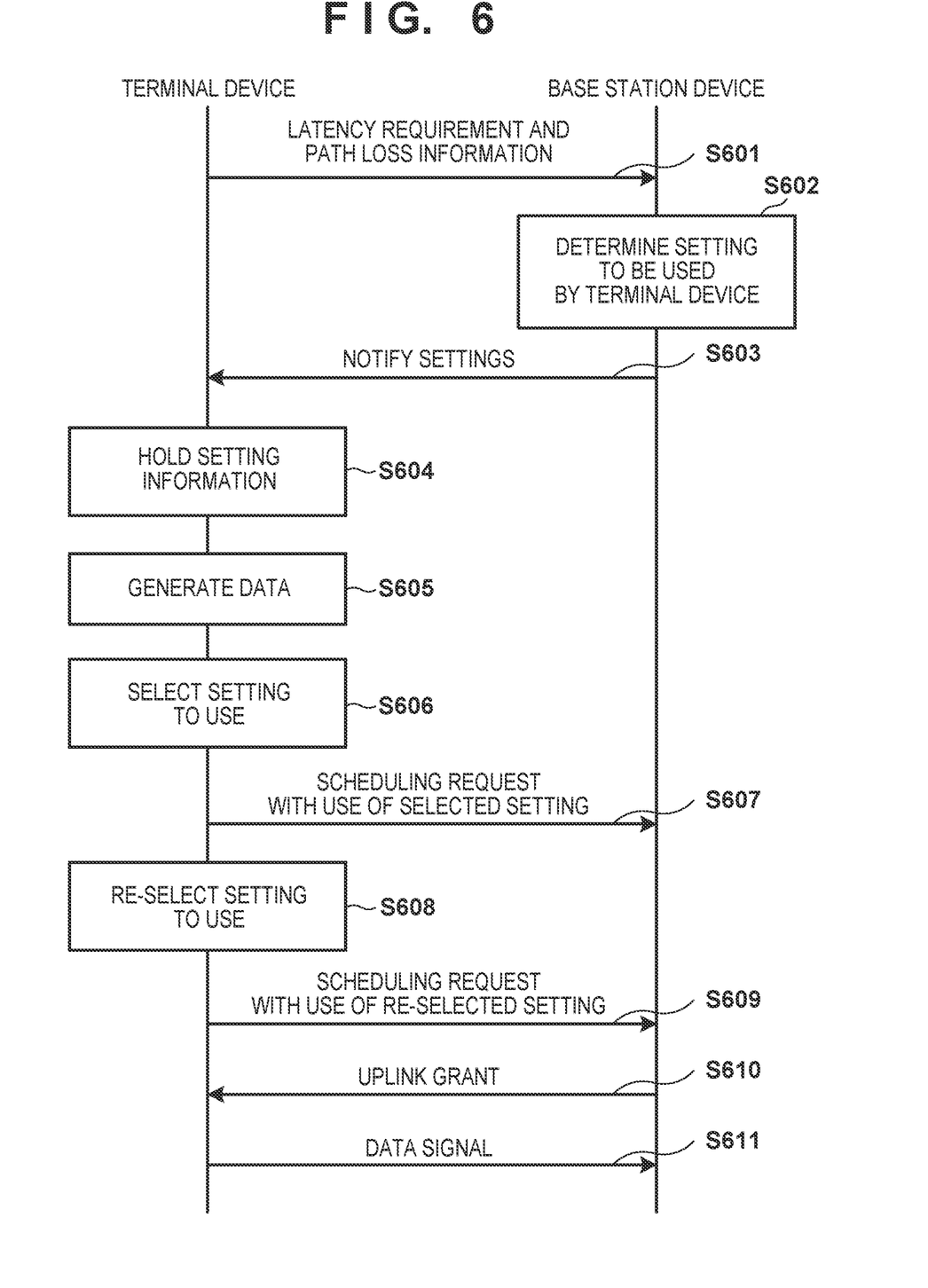
FIG. 6 is a diagram showing an example of a flow of processing executed by the base station device and the terminal device.

Next, an example of the flow of processing executed by the base station device and the terminal device according to the present embodiment will be described with reference to FIG. 6. Note that FIG. 6 shows merely one example, and one or more of the below-described processing steps (e.g., S601 to S603) may be omitted, and additional processing steps may be added.

First, initial setting is performed between the terminal device and the base station device regarding the setting of the radio resource that is to be used when the terminal device transmits a scheduling request. For example, the terminal device transmits, to the base station device, information indicating the latency requirement of a radio bearer established by the terminal device, and transmission path loss information regarding the transmission path from the base station device to the terminal device (S601). Then, based on the received information, the base station device determines one or more settings regarding the radio resource that is to be used by the terminal device (S602), and transmits information indicating the determined one or more settings to the terminal device (S603). The terminal device holds the received one or more settings (S604). Here, assume that the terminal device holds multiple settings. For this reason, the terminal device holds default usage settings and previously received settings, and can update the held settings with use of the settings received from the base station device, for example. Also, the base station device may determine two or more settings and transmit the two or more settings to the terminal device.

The execution of setting processing in steps S601 to S604 is triggered by the generation of data that is to be transmitted in an uplink in the terminal device, for example. For example, the information transmitted in step S601 can be included in a random access preamble that the terminal device transmits to the base station device, or can be included in another signal that is transmitted in parallel with the random access preamble. As another example, the terminal device selects one of multiple usable preambles in accordance with the amount of latency requirement and the transmission path loss information and transmits the selected preamble, and the base station device can specify the latency requirement and the transmission path loss information based on which preamble was transmitted. The base station device then transmits a random access response, and, in accordance with reception of the response, the terminal device transmits an RRC message that requests establishment of a connection. Then, in response to the RRC message from the terminal device, the base station device transmits an RRC message for establishing a connection, and the information in step S603 can be transmitted at that time. Note that these are merely examples, and the processing in steps S601 to S604 may be performed using a procedure other than the random access procedure, or using other signals.

When data that is to be transmitted is generated (S605), the terminal device selects, from among settings that are held in advance, a setting of a radio resource that can be used when transmitting a scheduling request for the transmission of such data (S606). The terminal device transmits a scheduling request to the base station device with use of the radio resource that corresponds to the selected setting (S607). If an uplink grant is received from the base station device in response to the scheduling request, the terminal device transmits a data signal with use of the radio resource that is designated in the uplink grant.

In FIG. 6, assume that the base station device fails to receive the scheduling request that was transmitted from the terminal device in step S607, and does not issue an uplink grant. In this case, the terminal device does not receive an uplink grant, and therefore again selects a setting for use (S608), and transmits a scheduling request to the base station device with use of the radio resource that corresponds to the newly selected setting (S609). Thereafter, if the base station device successfully receives the scheduling request, and there is a radio resource that can be used by the terminal device to transmit a data signal, the base station device transmits an uplink grant that designates the radio resource that is to be used for data signal transmission (S610). The terminal device then transmits a data signal with use of the radio resource designated in the uplink grant (S611).

In this processing, the terminal device transmits a scheduling request with use of a radio resource having a short time duration and a short periodicity in step S607, and then transmits a scheduling request with use of a radio resource having a comparatively longer time duration or longer periodicity in step S609, for example. Accordingly, if an uplink grant is issued for the scheduling request in step S607 for example, the terminal device can transmit an uplink data signal with low latency. On the other hand, even if an uplink grant is not issued for the scheduling request in step S607 for example, the terminal device uses a setting corresponding to a radio resource having a longer time duration, thus making it possible to increase the probability that an uplink grant will be received. Note that the terminal device may select, as the setting for use, a setting according to which scheduling request transmission will be completed the soonest at the time of setting selection.

Note that the terminal device may hold multiple usable settings before data that is to be transmitted is generated as illustrated in FIG. 6, but there is no limitation to this. For example, data that is to be transmitted may be generated before settings are held, and, when such data is generated, the processing of steps S601 to S604 may be executed for the setting of a radio resource that the terminal device can use to transmit a scheduling request.

As described above, the terminal device selects one setting from among multiple settings in accordance with the circumstances and then transmits a scheduling request with use of the selected setting, thus making it possible to meet a demand for low latency when the communication environment is favorable, while also meeting a demand for the ability to communicate even when the communication environment is not favorable.

Although a representative configuration and processing flow according to the present embodiment has been described above, they are merely examples, and various changes and modifications to the embodiment in this specification that fall within the scope described in the claims are also of course included in the scope of rights of the present invention.

The present invention is not limited to the above embodiment, and may be changed and modified in various ways without departing from the spirit and the scope of the present invention. Therefore, to apprise the public of the scope of the present invention, the following claims are made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A terminal device, comprising:
   one or more processors; and
   one or more memories that stores a computer-readable instruction for causing, when executed by the one or more processors, the one or more processors to at least:
      receive a plurality of scheduling request (SR) settings from a base station, wherein each of the plurality of SR settings corresponds to different combinations of a bandwidth, a time duration, and a periodicity, and each of the plurality of SR settings is capable of being used for transmission of a scheduling request in a cell served by the base station device;
      select, in a case where data that is to be transmitted to the base station device is generated, one SR setting for use in transmission of the scheduling request to the base station device, from among the plurality of SR settings, wherein the terminal device can select the one SR setting from the plurality of SR settings without receiving from the base station an instruction that designates the one SR setting; and
      transmit the scheduling request to the base station device with use of the one SR setting that was selected.

2. The terminal device according to claim 1, wherein in a case where an uplink grant corresponding to the scheduling request that was transmitted with use of a first SR setting among the plurality of SR settings is not received from the base station device, the computer-readable instruction further causing, when executed by the one or more processors, the one or more processors to at least:
   select a second SR setting that is different from the first SR setting from among the plurality of SR settings, and
   transmit the scheduling request to the base station device with use of the second SR setting.

3. The terminal device according to claim 2, wherein the second SR setting is selected if the uplink grant is not received from the base station device in a case where the scheduling request was transmitted a predetermined number of times or over a predetermined time period with use of the first SR setting.

4. The terminal device according to claim 2, wherein the time duration corresponding to the first SR setting is shorter than the time duration corresponding to the second SR setting, and the bandwidth corresponding to the first SR setting is wider than the bandwidth corresponding to the second SR setting.

5. The terminal device according to claim 1, wherein the one SR setting is selected from among the plurality of SR settings based on transmission path loss between the base station device and the terminal device.

6. The terminal device according to claim 1, wherein the plurality of SR settings is received with use of an RRC message that is transmitted by the base station device for establishment of a connection between the base station device and the terminal device.

7. A base station device, comprising:
   one or more processors; and
   one or more memories that stores a computer-readable instruction for causing, when executed by the one or more processors, the one or more processors to at least:
      determine a plurality of scheduling request (SR) settings that correspond to different combinations of a bandwidth, a time duration, and a periodicity and are to be used by a terminal device to transmit a scheduling request, and each of the plurality of SR settings is capable of being used for transmission of a scheduling request in a cell served by the base station device; and
      perform a SR configuration for the terminal device by transmitting the plurality of SR settings to the terminal device, wherein the plurality of SR settings enable the terminal device to select one SR setting for use in transmission of the scheduling request from the plurality of SR settings without transmitting by the base station device an instruction that designates the one SR setting.

8. The base station device according to claim 7, wherein the plurality of SR settings are determined in accordance with a latency requirement of a radio bearer established by the terminal device.

9. The base station device according to claim 7, wherein the plurality of SR settings are determined based on transmission path loss between the base station device and the terminal device.

10. The base station device according to claim 7, wherein the plurality of SR settings is transmitted to the terminal device using an RRC message for establishment of a connection between the base station device and the terminal device.

11. A method for controlling a terminal device, comprising:
   receiving a plurality of scheduling request (SR) settings from a base station, wherein each of the plurality of SR settings corresponds to different combinations of a bandwidth, a time duration, and a periodicity, and each of the plurality of SR settings is capable of being used for transmission of a scheduling request in a cell served by the base station device;

selecting, in a case where data that is to be transmitted to the base station device is generated, one SR setting for use in transmission of the scheduling request to the base station device, from among the plurality of SR settings, wherein the terminal device can select the one SR setting from the plurality of SR settings without receiving from the base station an instruction that designates the one SR setting; and transmitting the scheduling request to the base station device with use of the one SR setting that was selected.

12. A method for controlling a base station device, comprising:

determining a plurality of scheduling request (SR) settings that correspond to different combinations of a bandwidth, a time duration, and a periodicity and are to be used by a terminal device to transmit a scheduling request, and each of the plurality of SR settings is capable of being used for transmission of a scheduling request in a cell served by the base station device; and performing a SR configuration for the terminal device by transmitting the plurality of SR settings to the terminal device, wherein the plurality of SR settings enable the terminal device to select one SR setting for use in transmission of the scheduling request from the plurality of SR settings without transmitting by the base station device an instruction that designates the one SR setting.

13. A non-transitory computer-readable storage medium that stores a program for causing a computer included in a terminal device to:

receive a plurality of scheduling request (SR) settings from a base station, wherein each of the plurality of SR settings corresponds to different combinations of a bandwidth, a time duration, and a periodicity, and each of the plurality of SR settings is capable of being used for transmission of a scheduling request in a cell served by the base station device;

select, in a case where data that is to be transmitted to the base station device is generated, one SR setting for use in transmission of the scheduling request to the base station device, from among the plurality of SR settings, wherein the terminal device can select the one SR setting from the plurality of SR settings without receiving from the base station an instruction that designates the one SR setting; and transmit the scheduling request to the base station device with use of the one SR setting that was selected.

14. A non-transitory computer-readable storage medium that stores a program for causing a computer included in a base station device to:

determine a plurality of scheduling request (SR) settings that correspond to different combinations of a bandwidth, a time duration, and a periodicity and are to be used by a terminal device to transmit a scheduling request, and each of the plurality of SR settings is capable of being used for transmission of a scheduling request in a cell served by the base station device; and perform a SR configuration for the terminal device by transmitting the plurality of SR settings to the terminal device, wherein the plurality of SR settings enable the terminal device to select one SR setting for use in transmission of the scheduling request from the plurality of SR settings without transmitting by the base station device an instruction that designates the one SR setting.

* * * * *